(12) United States Patent
Magner et al.

(10) Patent No.: US 10,718,286 B2
(45) Date of Patent: Jul. 21, 2020

(54) SYSTEM AND METHOD FOR CONTROLLING FUEL SUPPLIED TO AN ENGINE

(71) Applicant: Ford Global Technologies, LLC, Dearborn, MI (US)

(72) Inventors: Stephen William Magner, Farmington Hills, MI (US); Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 499 days.

(21) Appl. No.: 15/244,810

(22) Filed: Aug. 23, 2016

(65) Prior Publication Data

US 2018/0058357 A1 Mar. 1, 2018

(51) Int. Cl.
*F02D 41/40* (2006.01)
*F02D 41/14* (2006.01)
*F02D 41/04* (2006.01)
*F02D 41/00* (2006.01)
*F02D 41/30* (2006.01)
*F02D 41/24* (2006.01)
*F02D 41/38* (2006.01)
*F02D 41/20* (2006.01)

(52) U.S. Cl.
CPC ..... *F02D 41/1481* (2013.01); *F02D 41/0087* (2013.01); *F02D 41/047* (2013.01); *F02D 41/1479* (2013.01); *F02D 41/1482* (2013.01); *F02D 41/1483* (2013.01); *F02D 41/3005* (2013.01); *F02D 41/40* (2013.01); *F02D 41/2451* (2013.01); *F02D 2041/1412* (2013.01); *F02D 2041/1431* (2013.01); *F02D 2041/2055* (2013.01); *F02D 2041/389* (2013.01); *F02D 2200/0618* (2013.01); *Y02T 10/44* (2013.01)

(58) Field of Classification Search
CPC ............. F02D 41/1481; F02D 41/0087; F02D 41/008; F02D 41/047; F02D 41/1401; F02D 41/401; F02D 41/40; F02D 41/0295; F02D 2041/1431; F02D 2041/2055; F02D 2200/0618; Y02T 10/44
USPC ....................................................... 123/478
See application file for complete search history.

(56) References Cited

U.S. PATENT DOCUMENTS

| 4,391,240 | A | * | 7/1983 | Sugasawa | ............... | F02D 17/02 |
| | | | | | | 123/198 F |
| 5,363,831 | A | * | 11/1994 | Tomisawa | ........... | F02D 41/1477 |
| | | | | | | 123/695 |
| 5,463,551 | A | * | 10/1995 | Milunas | ................. | B60K 28/16 |
| | | | | | | 180/197 |
| 6,302,091 | B1 | * | 10/2001 | Iida | ....................... | F02D 41/047 |
| | | | | | | 123/681 |

(Continued)

*Primary Examiner* — Lindsay M Low
*Assistant Examiner* — Joshua Campbell
(74) *Attorney, Agent, or Firm* — Geoffrey Brumbaugh; McCoy Russell LLP

(57) ABSTRACT

Systems and methods for injecting fuel to an engine in response to a fuel injection delay are presented. The method includes determining fuel delay in a fuel injected engine with cylinders that may be deactivated. In one example, the fuel injection delay is determined via a cylinder firing schedule array when the cylinder firing schedule array is available. The fuel injection delay is determined via a weighted average of a fuel injection delay of a present engine cycle and a fuel injection delay of a past engine cycle when the cylinder firing schedule array is not available.

7 Claims, 8 Drawing Sheets

(56) References Cited

U.S. PATENT DOCUMENTS

| | | | |
|---|---|---|---|
| 7,757,666 B2* | 7/2010 | Whitney | F02D 37/02 |
| | | | 123/198 DB |
| 7,987,840 B2 | 8/2011 | Magner et al. | |
| 8,473,179 B2* | 6/2013 | Whitney | F02D 13/0207 |
| | | | 701/102 |
| 8,499,624 B1* | 8/2013 | Simpson | F02D 41/1476 |
| | | | 73/114.72 |
| 9,328,687 B2 | 5/2016 | Jankovic et al. | |
| 2005/0022797 A1* | 2/2005 | Ikemoto | F02D 41/0032 |
| | | | 123/673 |
| 2008/0257325 A1* | 10/2008 | Takubo | F01N 11/007 |
| | | | 123/672 |
| 2009/0118977 A1* | 5/2009 | Whitney | F02D 37/02 |
| | | | 701/103 |
| 2010/0263632 A1* | 10/2010 | Miyake | F02D 41/20 |
| | | | 123/476 |
| 2011/0259298 A1* | 10/2011 | Imamura | F02B 19/108 |
| | | | 123/436 |
| 2013/0213352 A1* | 8/2013 | Kumar | F02D 41/401 |
| | | | 123/406.23 |
| 2013/0231844 A1* | 9/2013 | Uhrich | F01N 11/007 |
| | | | 701/104 |
| 2014/0039780 A1* | 2/2014 | Berkemeier | F02D 35/026 |
| | | | 701/104 |
| 2016/0025024 A1* | 1/2016 | Huber | F02D 19/023 |
| | | | 123/704 |

* cited by examiner

SYSTEM AND METHOD FOR CONTROLLING FUEL SUPPLIED TO AN ENGINE

FIELD

The present description relates to a system and methods for supplying fuel to a variable displacement engine. The system and methods provide for adjusting a fuel delay compensation value responsive to whether or not fuel is delivered to engine cylinders.

BACKGROUND AND SUMMARY

Fuel may be injected to an internal combustion engine so that the engine may provide a requested or desired torque. The amount of fuel injected to the engine may be different than an amount of fuel commanded to be injected to the engine. Further, the amount of fuel requested to be injected may be different than an amount of fuel that provides a desired engine air-fuel mixture ratio. The fueling differences may result from engine component tolerance variation, sensor measurement errors, and errors in open loop fuel control parameters. An estimate of engine air-fuel ratio may be determined via an oxygen sensor, and the engine air-fuel ratio may be fed back to an engine controller to compensate errors between a desired engine air-fuel ratio and a measured air-fuel ratio. The controller may determine an engine air-fuel ratio error by subtracting the measured engine air-fuel ratio from the desired engine air-fuel ratio. The engine air-fuel ratio error may be multiplied by a gain (e.g., real number) to correct the engine air-fuel ratio error. If the value of the gain is small, a long period of time may be needed to drive the engine air-fuel ratio error toward a value of zero. However, if the gain is made too large, the engine air-fuel ratio may be driven to oscillate about the desired engine air-fuel ratio. The oscillations may increase engine emissions and degrade vehicle drivability.

The air-fuel oscillations may be related to a fuel injection delay time between when the fuel is injected to a cylinder and a time when its combustion byproducts are converted into an engine air-fuel ratio via the oxygen sensor and a transfer function. The fuel injection delay time may include but is not limited to the time between fuel injection and combustion of fuel within the cylinder. The delay may also include the amount of time it takes the engine to rotate through the exhaust stroke of the cylinder receiving the fuel and release exhaust gases from the cylinder into the exhaust manifold as well as an amount of time it takes the exhaust gases to travel from the exhaust valves of the cylinder to the oxygen sensor in the exhaust manifold. The delay time may cause the controller to observe no change in engine air-fuel ratio when the engine air-fuel may have already changed. Consequently, the controller may attempt to increase the control action (e.g., amount of fuel injected) to drive the measured engine air-fuel ratio closer to the desired engine air-fuel ratio. However, since the engine air-fuel ratio already changed due to earlier control adjustments, the engine air-fuel ratio may be overdriven, thereby causing the controller to over compensate in a reverse direction, which may induce the engine air-fuel ratio oscillations.

The fuel injection delay time may be empirically determined via adjusting an air-fuel ratio of engine cylinders at a steady state engine speed and recording an amount of time it take to observe a change in the engine air-fuel ratio. The delay value may be stored in memory where it represents fuel injection time delay for each engine cylinder. The fuel injection delay value may be applied in a controller compensation network to allow for increased gain while reducing the possibility of engine air-fuel ratio oscillations. However, recent developments have enabled each cylinder of an engine to be activated and deactivated independent of other cylinders to increase engine efficiency and provide a desired amount of torque. Further, the cylinders may be activated and deactivated in many different combinations to maintain cylinder temperature and reduce engine oil consumption. As a result, a single value for the fuel injection delay estimate for a particular engine speed and load may no longer be appropriate. Therefore, it may be desirable to provide a way of determining fuel injection delay for an engine having cylinders that may be deactivated.

The inventors herein have recognized the above-mentioned issues and have developed an engine control method, comprising: injecting fuel to an engine via a controller in response to a fuel injection delay produced via a weighted average of a fuel injection delay of a past engine cycle and a fuel injection delay of a present engine cycle.

By adjusting a fuel injection delay based on a weighted average of a fuel injection delay of a past engine cycle and a fuel injection delay of a present engine cycle, it may be possible to provide the technical result of an improved estimate of fuel injection delay when it is unknown whether or not one or more cylinders of a cylinder bank will be deactivated (e.g., cessation of combustion and fuel injection to the engine cylinder) in the near future. Incorporating past fuel injection delays and present fuel injection delay into an estimate of future fuel injection delay provides a reasonable estimate of future fuel injection delays when past cylinder deactivation patterns are correlated to future cylinder deactivation patterns. In cases where a future cylinder deactivation pattern is known, the fuel injection delay may be determined via adding a base cylinder delay time to an extra delay time that is based on the expected cylinder deactivation pattern. In these ways, whether or not a future cylinder firing pattern is known, an estimate of fuel injection delay may be determined.

The present description may provide several advantages. In particular, the approach may provide improved fuel injection control by permitting higher gains so that fuel injection errors may be reduced in a more timely manner. Further, the approach provides for estimating fuel injection delay whether or not a future cylinder firing pattern is known. In addition, the approach may provide improved air-fuel control for engines that may deactivate engine cylinders in a large number of different patterns.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
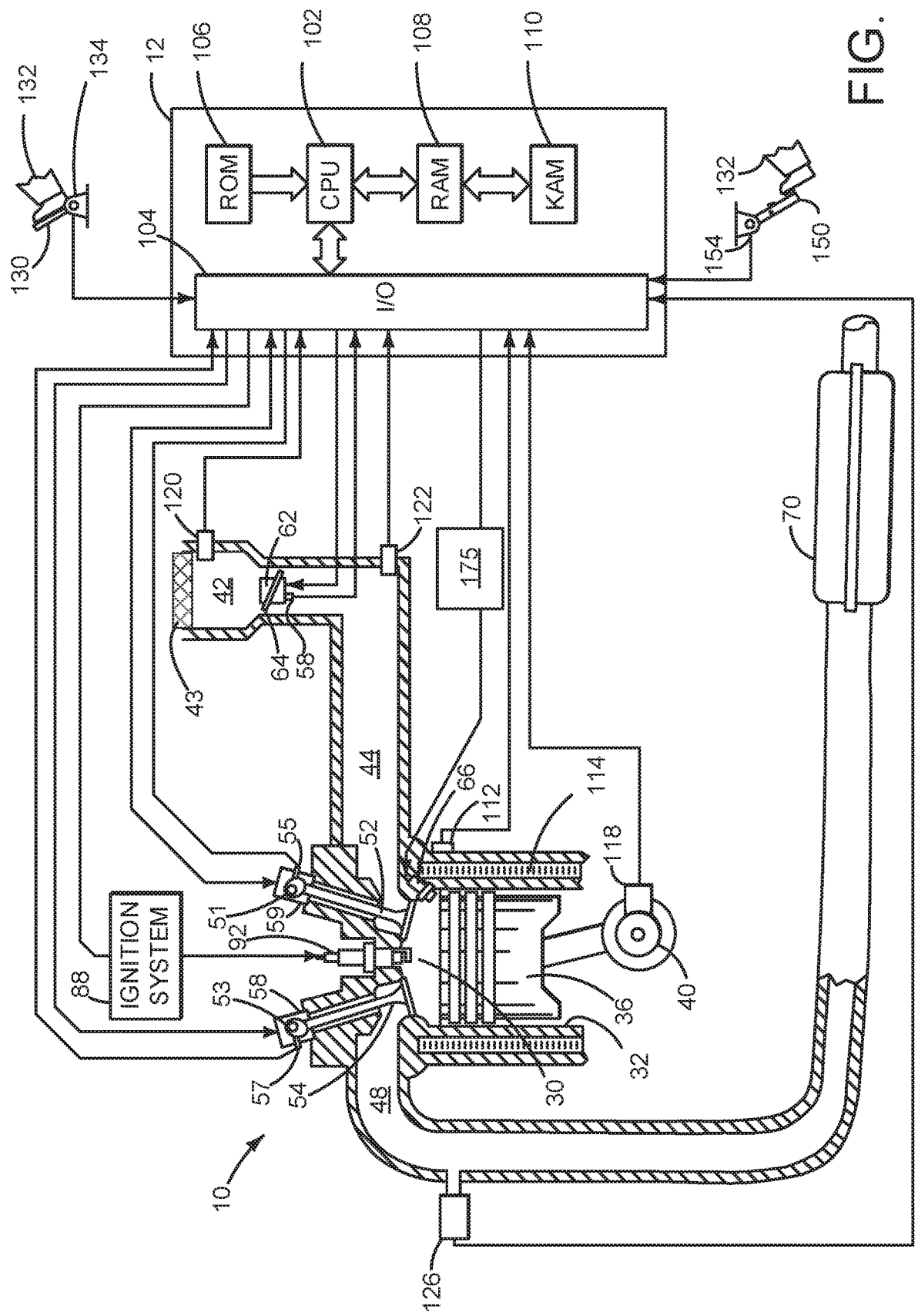
FIG. 1 is a schematic diagram of an engine.
Figure 2A:
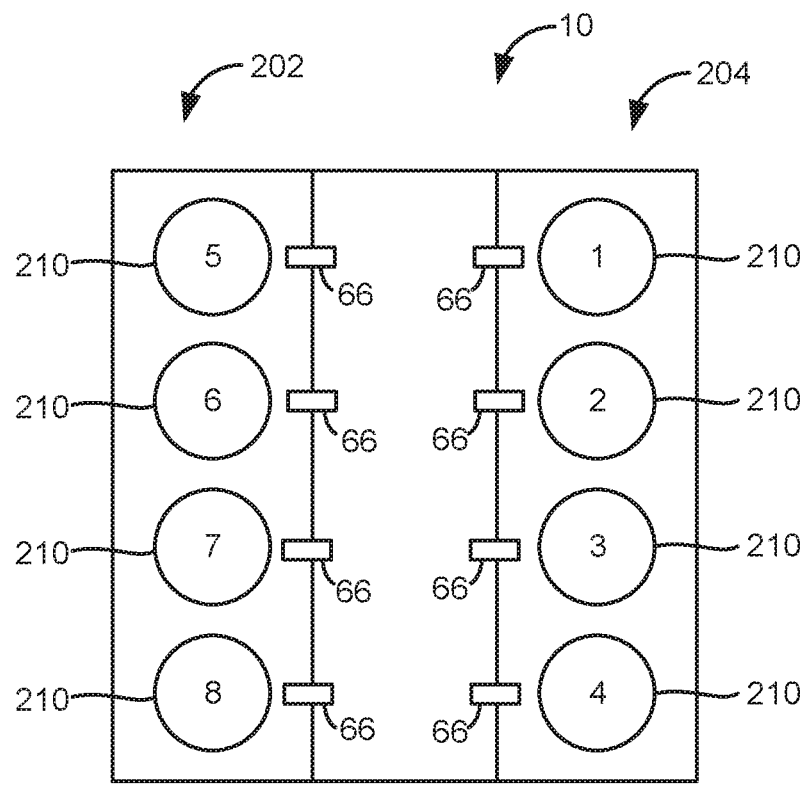
FIG. 2A is a schematic diagram of an eight cylinder engine with two cylinder banks.
Figure 2B:
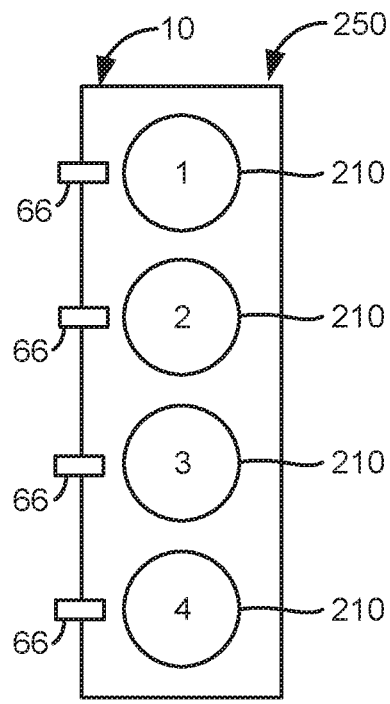
FIG. 2B is a schematic diagram of a four cylinder engine with a single cylinder bank.
Figure 3:
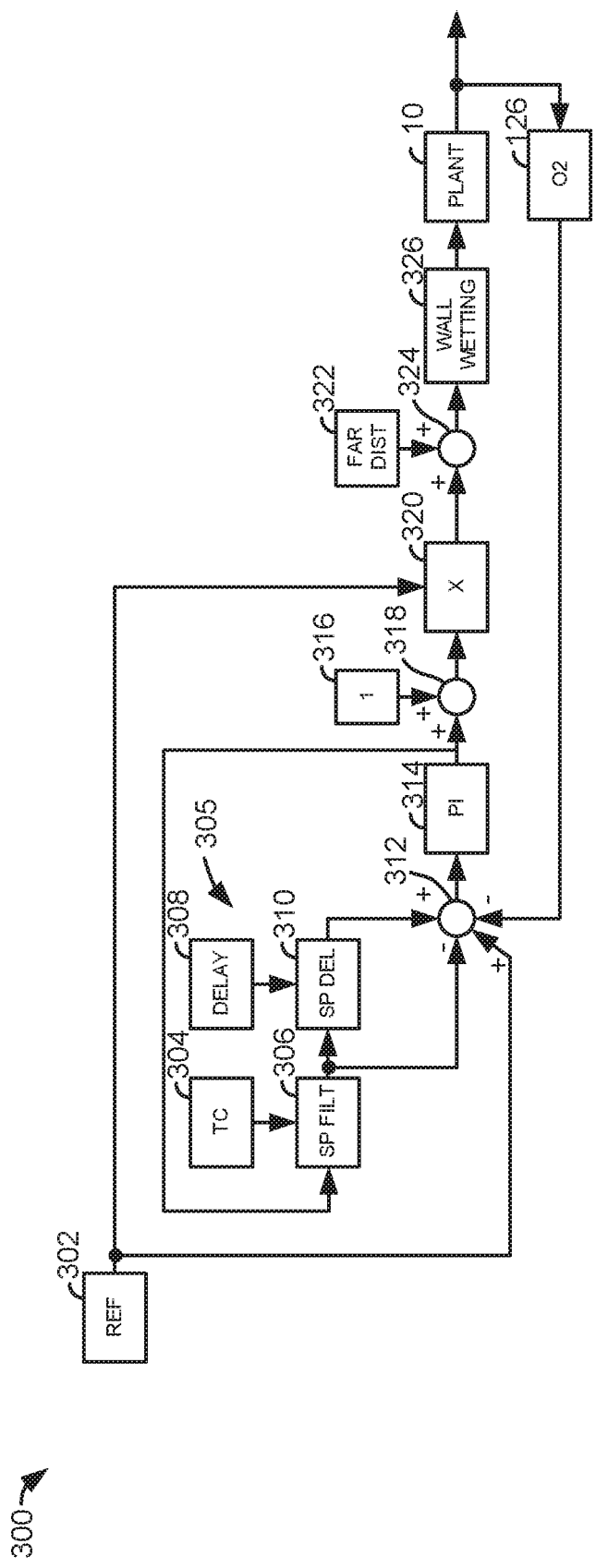
FIG. 3 is a block diagram of a fuel control system for a cylinder bank.
Figure 4:
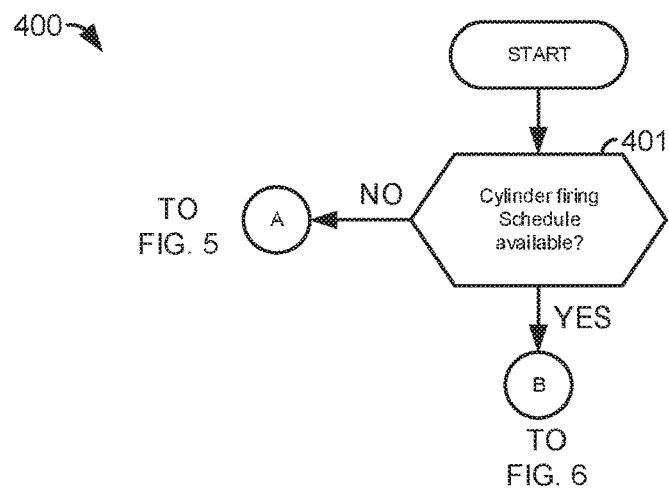
FIGS. 4-6 show a flow chart of an example method for determining and applying fuel injection delay.
Figure 5:
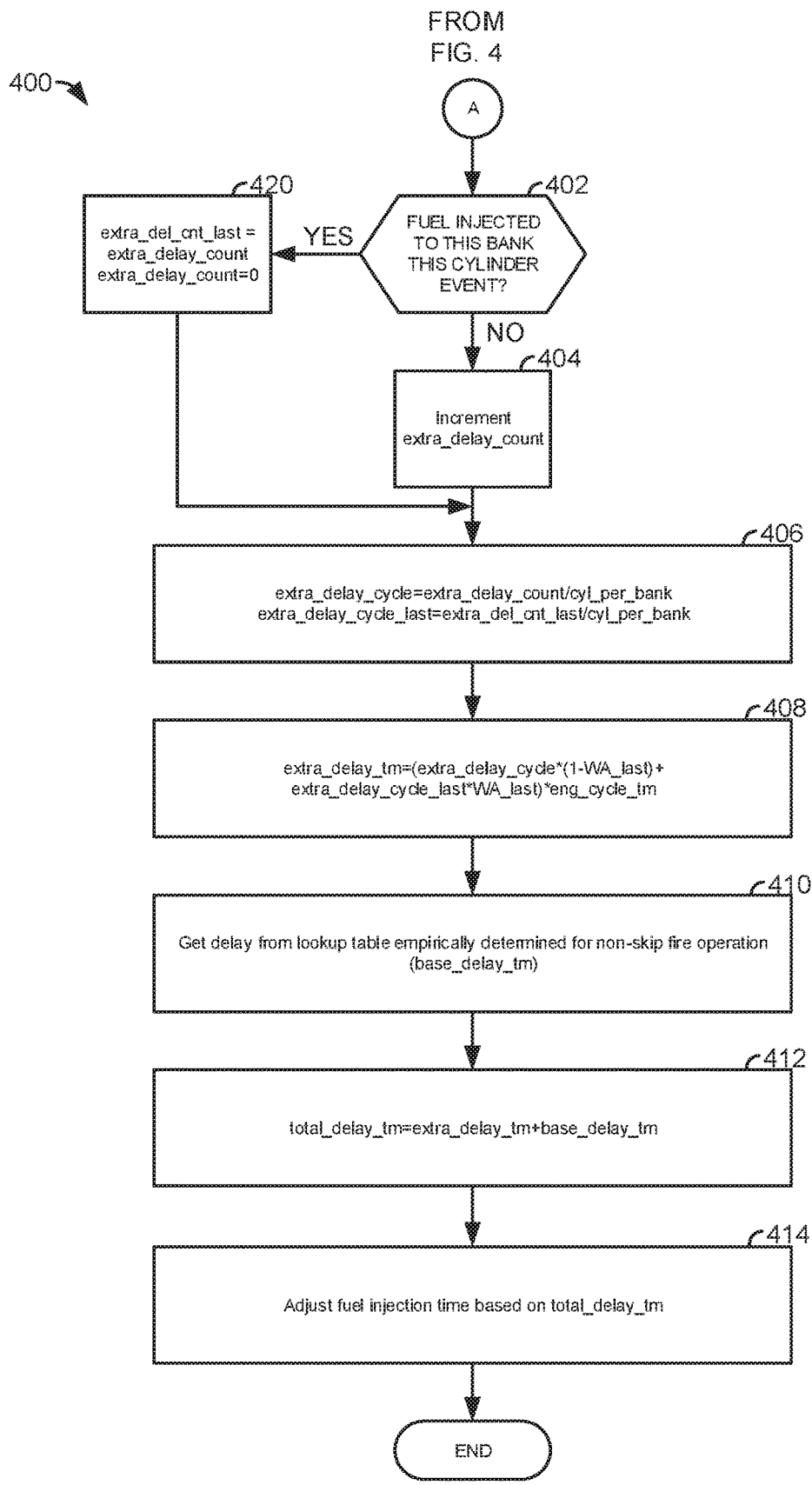
Figure 6:
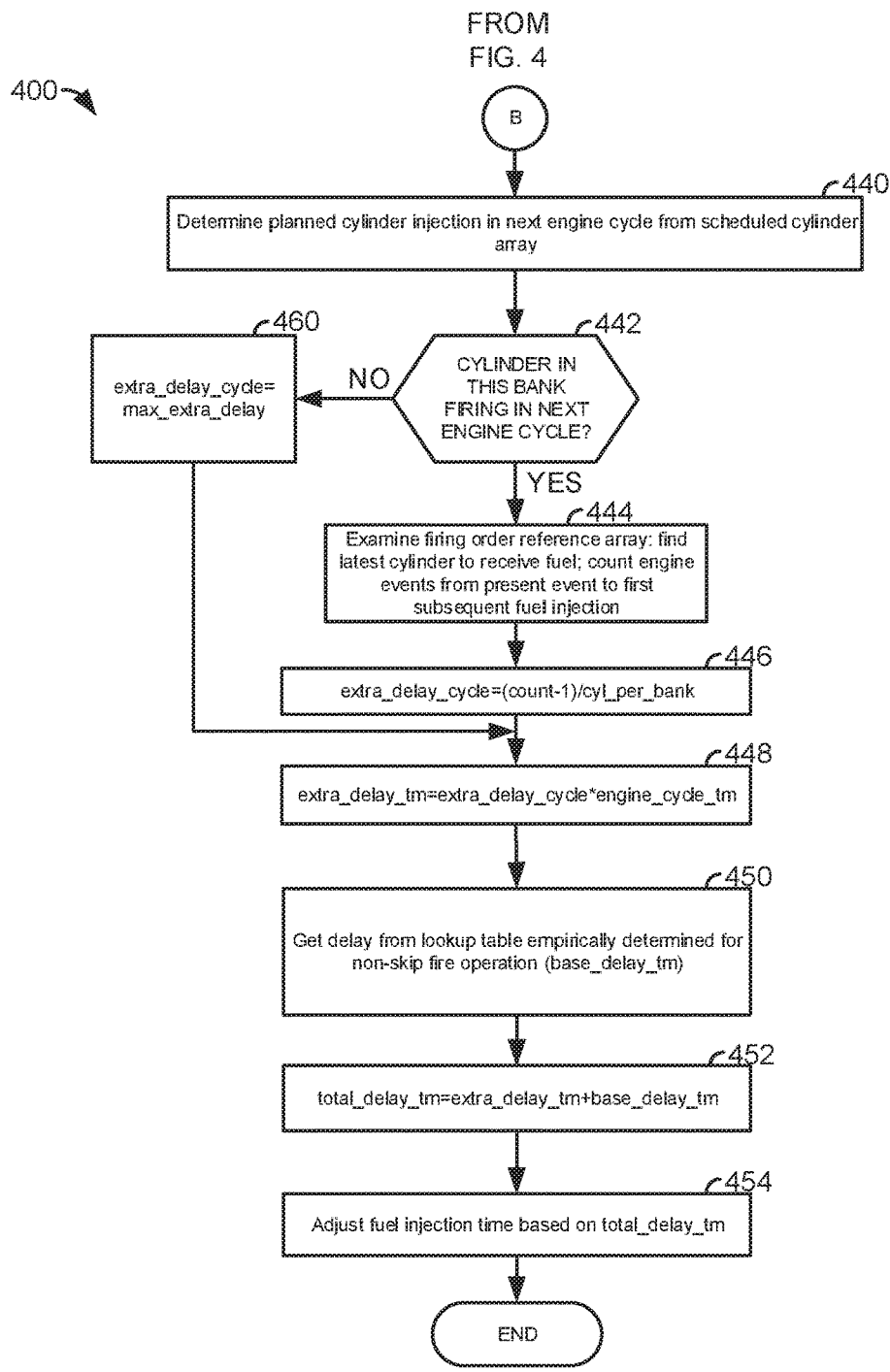
Figure 7:
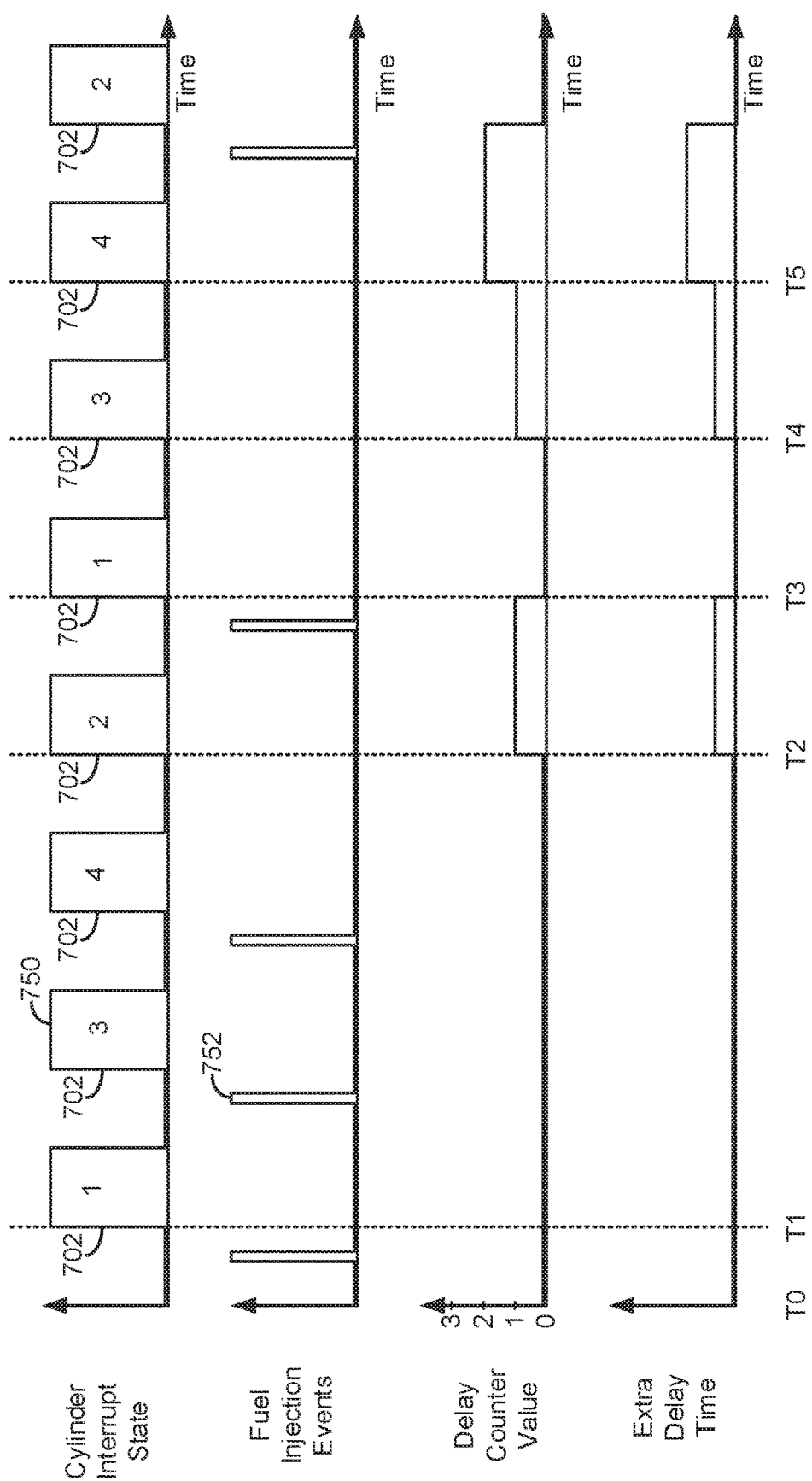
FIG. 7 is an example sequence where fuel injection delay is determined.
Figure 8:
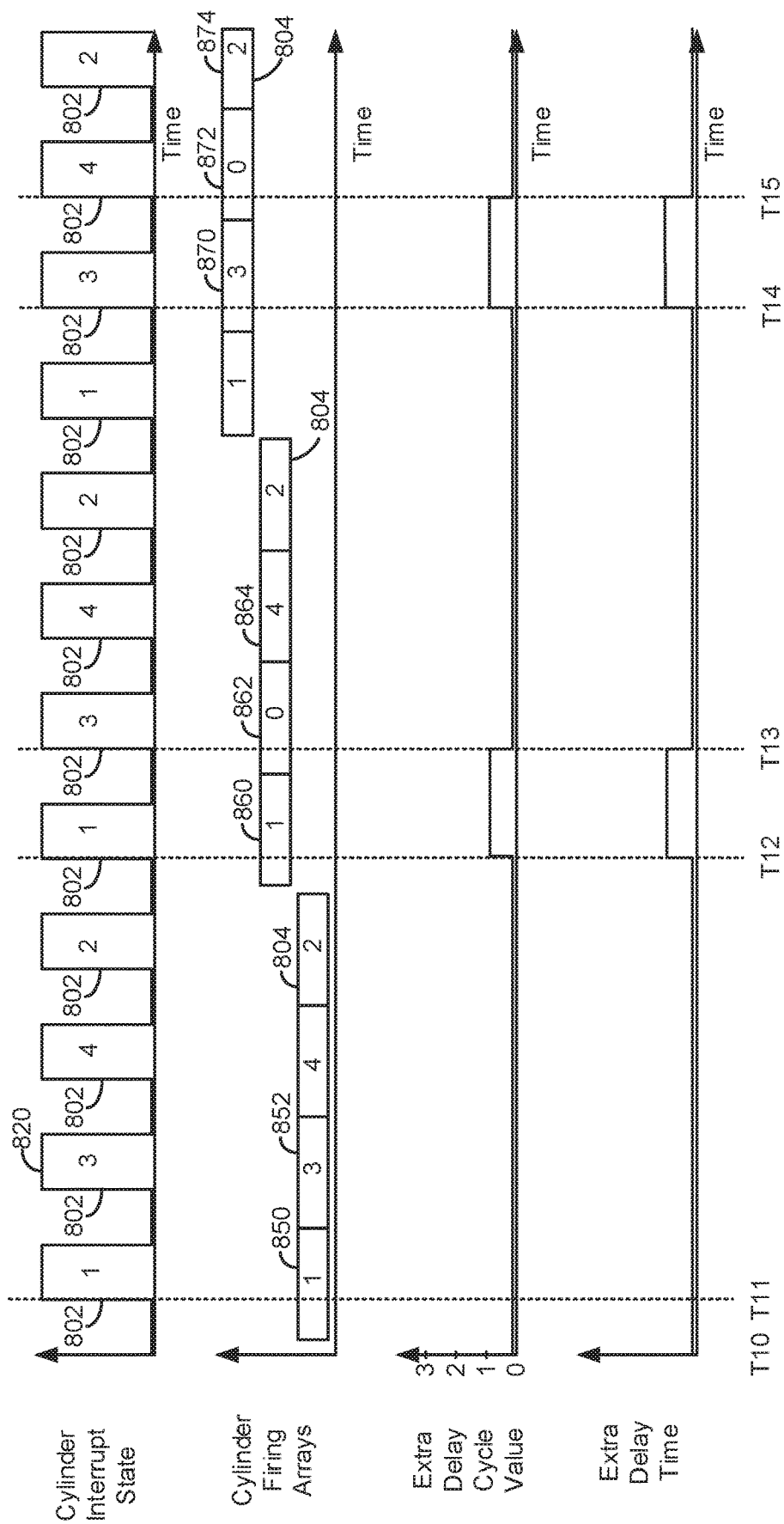
FIG. 8 is an alternate example sequence where fuel injection delay is determined.

The present description is related to determining fuel injection delay for an engine that includes cylinders that may be deactivated and reactivated from time to time. The fuel injection delay determining methods described herein may be applied to a cylinder bank of an engine. Fuel injection delay times of multiple cylinder bank engines may be determined via reproducing the methods for determining fuel injection timing for a single bank of cylinders and applying the method to other cylinder banks. An engine cylinder of an engine is shown in FIG. 1. The engine cylinder of FIG. 1 may be part of an engine that includes multiple cylinders as shown in FIGS. 2A and 2B. Fuel supplied to a bank of cylinders may be regulated via a controller as shown in FIG. 3. FIGS. 4-6 show methods for determining fuel injection delay. FIGS. 7 and 8 show example sequences where fuel injection delay is determined.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40 via intake valve phase actuator 59 and exhaust valve phase actuator 58.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175. In addition, intake manifold 44 is shown communicating with optional electronic throttle 62 (e.g., a butterfly valve) which adjusts a position of throttle plate 64 to control air flow from air filter 43 and air intake 42 to intake manifold 44. Throttle 62 regulates air flow from air filter 43 in engine air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2A, an example multi-cylinder engine that includes two cylinder banks is shown. The engine includes cylinders and associated components as shown in FIG. 1. Engine 10 includes eight cylinders 210. Each of the eight cylinders is numbered and the numbers of the cylinders are included within the cylinders. Fuel injectors 66 selectively supply fuel to each of the cylinders that are activated (e.g., combusting fuel during a cycle of the engine). Cylinders 1-8 may be selectively deactivated to improve engine fuel economy when less than the engine's full torque capacity is requested. For example, cylinders 2, 3, 5, and 8 (e.g., a pattern of deactivated cylinders) may be deactivated during an engine cycle (e.g., two revolutions for a four stroke engine). During a different engine cycle, cylinders 1, 4, 6, and 7 may be deactivated. Further, other patterns of cylinders may be selectively deactivated based on vehicle operating conditions.

Engine 10 includes a first cylinder bank 204, which includes four cylinders 1, 2, 3, and 4. Engine 10 also includes a second cylinder bank 202, which includes four cylinders 5, 6, 7, and 8. Cylinders of each bank may be active or deactivated during a cycle of the engine. A first fuel controller adjusts fuel injection timing to control amounts of fuel injected to the first cylinder bank. A second fuel controller adjusts fuel injection timing to control amounts of fuel injected to the second cylinder bank. The fuel controllers may be constructed as shown in FIG. 3. The air-fuel ratio of the first cylinder bank may be controlled independently from the air-fuel ratio of the second cylinder bank.

Referring now to FIG. 2B, an example multi-cylinder engine that includes one cylinder banks is shown. The engine includes cylinders and associated components as shown in FIG. 1. Engine 10 includes four cylinders 210. Each of the four cylinders is numbered and the numbers of the cylinders are included within the cylinders. Fuel injectors 66 selectively supply fuel to each of the cylinders that are activated (e.g., combusting fuel during a cycle of the engine). Cylinders 1-4 may be selectively deactivated to improve engine fuel economy when less than the engine's full torque capacity is requested. For example, cylinders 2 and 3 (e.g., a pattern of deactivated cylinders) may be deactivated during an engine cycle (e.g., two revolutions for a four stroke engine). During a different engine cycle, cylinders 1 and 4 may be deactivated. Further, other patterns of cylinders may be selectively deactivated based on vehicle operating conditions.

Engine 10 includes a single cylinder bank 250, which includes four cylinders 1-4. Cylinders of the single bank may be active or deactivated during a cycle of the engine. A fuel controller adjusts fuel injection timing to control amounts of fuel injected to the sole cylinder bank. The fuel controller may be constructed as shown in FIG. 3.

The system of FIGS. 1-2B provides for an engine system, comprising: an engine including one or more cylinder deactivating mechanisms; a controller including executable instructions stored in non-transitory memory to inject an amount of fuel to a cylinder of the engine in response to a fuel injection delay, the fuel injection delay based on a cylinder firing schedule array when the cylinder firing schedule array is available, and the fuel injection delay based on a weighted average of a fuel injection delay of a past engine cycle and a fuel injection delay of a present engine cycle when the firing schedule array is not available. The engine system includes where the fuel injection delay is provided via adding a base fuel injection delay to the weighted average. The engine system includes where the fuel injection delay is based on a base fuel injection delay time. The engine system also includes where the base fuel injection delay time is a fuel injection delay time when all engine cylinders of an engine are combusting air and fuel. The engine system also includes where the fuel injection delay is further based on an engine cycle time when the cylinder firing schedule array is available. The engine system further comprises additional instructions to base the fuel injection delay on a predetermined number of delay cycles if no cylinders are scheduled to fire in a next cycle of the engine.

FIG. 3 shows a closed loop fuel control system 300 that includes a Smith Predictor (SP) control section 305 to compensate for the response delay between injection fuel and detection of combustion products of the fuel at the oxygen sensor (e.g., 126 of FIG. 1). The controller of FIG. 3 may be incorporated into and may cooperate with the system of FIGS. 1, 2A, and 2B. Further, at least portions of the controller may be incorporated as executable instructions stored in non-transitory memory while other portions of the method may be performed via a controller transforming operating states of devices and actuators in the physical world. The SP control section 305 acts as a lead filter to compensate for the time delay between injection of fuel and observation of fuel combustion byproducts. The SP control section 305 includes an SP filter or prediction block 306 that is supplied a time constant from block 304 and it is connected in series with an SP delay block 310 so that the SP delay block receives the output of the SP filter block. The SP control section 305 includes an inner feedback loop in which the control signal output from the PI controller 314 is fed back to the input of the SP filter block 306. Block 306 uses a time constant that is a function of engine speed and load (normalized cylinder air charge). Block 308 is a fuel injection delay and the fuel injection delay applies a fuel injection delay that is determined as described in FIGS. 4-8. Block 310 implements the fuel injection delay from block 308 by delaying output of block 310 from the input of block 310 by the time amount requested by block 308. The Smith Predictor provides two estimated signals: the response of the system with the pure delay (output of 310) and without it (output of 306). The Smith Predictor will allow the PI controller to essentially operate as if the actual system did not have the pure delay or is delay-free, as long as the output of the 310 and measured signal from oxygen sensor 126 match one another. In the case of a reference change, assuming no disturbance and that the blocks 306 and 310 have a correctly identified SP model of the actual system, this assumption is met and the system will respond as if no delay existed. If a disturbance occurs, then the error will be detected as a difference between the SP model (310) and the measured (126) system, which the controller will try to correct. In this way, the closed loop system is stabilized by the delay compensator, so much so that higher gains can be used. Because of this, the controller's response to a disturbance has a peak error that is somewhat reduced, and the duration of the error that is greatly reduced. For the application of fuel control, this makes the delay compensation very valuable, since it minimizes the integrated error of fuel/air ratio going to the catalyst, which can only absorb a limited amount of fuel/air deviation from stochiometry.

Block 302 represents a reference signal or desired engine air-fuel ratio or lambda (e.g., desired engine air-fuel ratio/ stoichiometric air-fuel ratio). Block 316 is a lambda value of one used to control the engine to a stoichiometric air-fuel mixture. Block 314 represents a proportional/integral controller. Block 10 represents the plant or engine. The outputs of blocks 302, 306, 310, 126 are summed together at 312, with appropriate sign, to provide a delay compensated error signal to the PI controller 314. Output of PI controller 314 is added to a value of one and multiplied by the reference value at block 320. The output from block 320 is a value of one when a stoichiometric air-fuel ratio is desired and when there is no error indicated from the oxygen sensor 126. Block 322 is a model of air-fuel ratio disturbances and block 326 is a cylinder intake wall wetting model. Output of multiplication block 320 is added to output of block 322 at summing junction 324. The desired engine air-fuel ratio is provided to plant or engine 10 via adjusting fuel injection timing and the amount of fuel injected to the engine. Oxygen sensor 126 samples exhaust gases and converts an oxygen concentration into a measured engine air-fuel ratio.

Smith predictor 305 compensates for fuel injection delays that may limit the amount of gain that may be applied within PI controller 314 to regulate engine air-fuel ratio. The gains of PI controller 314 may be a proportional gain $K_P$ and an integral gain $K_I$, which may be scalar real numbers that multiply the error input to PI controller 314 via summing block 312.

Referring now to FIGS. 4-6, a block diagram to determine fuel injection time delay of an engine that may selectively deactivate and activate cylinders to improve engine fuel economy is shown. The method of FIGS. 4-6 may be incorporated into and may cooperate with the system of FIGS. 1, 2A, and 2B. Further, at least portions of the method of FIGS. 4-6 may be incorporated as executable instructions stored in non-transitory memory while other portions of the method may be performed via a controller transforming operating states of devices and actuators in the physical world. Method 400 includes event based and time based operations as indicated below. Event based operations may be initiated by hardware interrupts produced via an engine position sensor or a signal that is based off input from an engine position sensor. Time based operations are initiated at predetermined time intervals scheduled by the controller. Method 400 may be part of a controller that controls fuel delivery to one cylinder bank of an engine.

At 401, method 400 judges if a cylinder firing schedule is available. In one example, a cylinder firing schedule is an array stored in memory that indicates which engine cylinders will fire during an engine cycle. FIG. 8 shows one example of a cylinder firing schedule. A cylinder firing schedule may not be available during some conditions such as if the controller does not include a cylinder firing schedule or if a cylinder firing schedule is not present because of operating conditions. For example, a cylinder firing schedule may not be available if the engine enters a degraded state or if the cylinder firing schedule cannot be revised at present operating conditions. If method 400 judges that a cylinder firing schedule is available, the answer is yes and method 400 proceeds to 402 of FIG. 5. Otherwise, the answer is no and method 400 proceeds to 440 of FIG. 6.

At 402, method 400 judges if fuel is injected to a cylinder of a cylinder bank controlled based on method 400 at a present cylinder interrupt. Step 402 may be initiated by a cylinder interrupt event. The cylinder interrupt may be generated based on a rising edge of a signal that is based on engine position sensor output (e.g., a signal based on output of a crankshaft position sensor and a camshaft position sensor). An example cylinder interrupt signal is shown in FIG. 7. A cylinder interrupt signal rising edge may be generated at 10 crankshaft degrees before top-dead-center compression stroke for each engine cylinder during an engine cycle. In one example, method 400 tracks which cylinder is a latest cylinder to receive fuel via a bit or word in memory. If no fuel is injected to a cylinder of the cylinder bank being regulated by the controller for the present cylinder interrupt, the answer is no and method 400 proceeds to 404. Otherwise, the answer is yes and method 400 proceeds to 420.

At 420, method 400 revises two variables stored in memory. First, method 400 updates variable extra_del_cnt_last to equal a value of variable extra_delay_count. The variable extra_delay_count is a value of a counter that keeps track of how many cylinder interrupts have occurred for the cylinder bank regulated by the controller without fuel being injected to the cylinder bank. The variable extra_delay_count is based on the present engine cycle. The variable extra_del_cnt_last is the value of the counter that keeps track of how many cylinder interrupts have occurred for the cylinder bank regulated by the controller without fuel being injected to the cylinder bank for a last or previous engine cycle. Thus, method 400 pushes the value of extra_delay_count into extra_del_cnt_last when fuel is injected to a cylinder at the present cylinder interrupt. Method 400 proceeds to 406.

At 404, method 400 increments the value of the counter stored in variable extra_delay_count by a value of one, which corresponds to one cylinder event (e.g., injection of fuel to the cylinder, or alternatively, combustion in the cylinder). Step 404 is also initiated by the cylinder interrupt. Method 400 proceeds to 406.

At 406, method 400 converts the count values from 402 and 404 into values having engine cycle units. In particular, the variable extra_delay_count is converted into engine cycle units by dividing extra_delay_count by the number of cylinders per engine cylinder bank, or extra_delay_cycle=extra_delay_count/cyl_per_bank, where extra_delay_cycle is the count of how many cylinder interrupts have occurred for the cylinder bank regulated by the controller without fuel being injected to the cylinder bank during the present engine cycle in engine cycle units. The variable extra_delay_cycle is a fractional number that is rounded. The variable cyl_per_bank is the number of cylinders within the cylinder bank being regulated by the controller.

The variable extra_del_cnt_last is converted into engine cycle units by dividing extra_del_cnt_last by the number of cylinders per engine cylinder bank, or extra_delay_cycle_last=extra_del_cnt/cyl_per_bank, where extra_delay_cycle_last is the count of how many cylinder interrupts have occurred for the cylinder bank regulated by the controller without fuel being injected to the cylinder bank during the last engine cycle in engine cycle units. The variable cyl_per_bank is the number of cylinders within the cylinder bank being regulated by the controller. The Step 406 is also initiated by the cylinder interrupt.

At 408, method 400 determines the additional or extra fuel injection delay time associated with deactivating one or more engine cylinders of a cylinder bank. In one example, the extra fuel injection delay time is a weighted average of present and past engine cycle fuel injection delays. Specifically, the extra or additional fuel injection delay time added to a base fuel injection delay time is given by the following equation: extra_delay_tm=(extra_delay_cycle*(1−WA_last)+extra_delay_cycle_last*WA_last)*engine_cycle_tm, where extra_delay_tm is the fuel injection delay time, WA is a weighting average parameter with a value between 0 and 1, engine_cycle_tm is the time it takes for the engine to complete two engine revolutions (or one cycle) at the present engine speed, and the other variables are as previously described. If the value variable WA is greater than 0.5 the last engine cycle's extra fuel injection delay is given more weight than the present engine cycle's fuel injection delay. The larger value of variable WA, the closer the present cylinder cycle's extra fuel injection delay will match the previous cylinder cycle's extra fuel injection delay. If all engine cylinders are reactivated, the extra fuel injection delay will reach a value of zero in two engine cycles no matter the value of WA. The operations of step 408 are performed at predetermined constant time intervals. Method 400 proceeds to 410.

At 410, method 400 retrieves a fuel injection time delay from a table in memory. The table in memory may be indexed via present engine speed and present engine torque output. The table outputs an empirically determined fuel injection time delay for when the engine is operating with all cylinders activated and combusting air and fuel. The base fuel injection time delay occupies a variable in memory base_delay_tm. The operations of step 410 are performed at predetermined constant time intervals. Method 400 proceeds to 412.

At 412, method 400 determines the total fuel injection delay time for the present engine cycle. The total fuel injection delay time is given by the equation: total_delay_tm=extra_delay_tm+base_delay_tm. The operations of step 412 are performed at predetermined constant time intervals. Method proceeds to 414.

At 414, method 400 adjusts a fuel injection delay time (e.g., a value stored in block 308 of FIG. 3) with the value determined at 412. Further, fuel injection timing adjustments are applied to timing of fuel injectors of a cylinder bank so that the amount of fuel injected to engine cylinders is adjusted responsive to the fuel injection delay time as describe in FIG. 3. Method 400 proceeds to exit.

In this way, fuel injection delay may be adjusted even if a cylinder firing schedule array is not available. The fuel injection delay time may allow proportional and integral gain values of a fuel controller to be increased without causing the fuel control system to oscillate fuel delivery.

At 440, method 400 queries a cylinder firing schedule array stored in memory. In one example, the array may include a predetermined number of cells that correspond to the number of engine cylinders. Cells in the array are populated with values that correspond to engine cylinder numbers or a value of zero. A value of zero indicates that no cylinder fires for the cylinder event associated with the cell in the array for the present engine cycle. A cylinder firing array for a four cylinder engine may be constructed as follows:

| Cell 1 | Cell 2 | Cell 3 | Cell 4 |
|--------|--------|--------|--------|
| 1 | 3 | 4 | 2 | where the array cells are outlined in bold. The first cell in the array is populated with a value of 1 to indicate cylinder number one is the first cylinder to fire (e.g., combust air and fuel) during the engine cycle. The second cell in the array is populated with a value of 3 to indicate cylinder number three is the second cylinder to fire during the engine cycle. The third cell in the array is populated with a value of four to indicate that cylinder number four is the third cylinder to fire during the engine cycle. The fourth cell in the array is populated with a value of two to indicate cylinder number two is the fourth cylinder to fire during the engine cycle. The array cells correspond to a firing order for the engine. For example, where the four cylinder engine has a firing order of 1, 3, 4, 2 the first array cell from left to right is the array cell for cylinder number one. The second array cell from the left to right is the array cell for cylinder number three, and so on.

Of course, cylinder firing schedule arrays may be constructed in alternative ways. For example, cylinder firing arrays may only contain values of one and zero where the particular cells of the array are assigned to selected engine cylinders.

Method 400 logs or stores to memory cylinders that will fire during the present engine cycle for the cylinder bank having fuel controlled by the present method. In the above example, the engine includes a single bank and all four cylinders are logged to memory as cylinders that will fire during the present engine cycle. Step 440 is initiated by a cylinder interrupt event. Method 400 proceeds to 442.

At 442, method 400 judges if fuel is injected to a cylinder of a cylinder bank controlled based on method 400 at a present cylinder interrupt according to values in the array evaluated at 440. Step 442 may be initiated by a cylinder interrupt event. If method 400 judges that a cylinder of the cylinder bank is to receive fuel and combust the fuel during the present engine cycle, the answer is yes and method 400 proceeds to 444. Otherwise, the answer is no and method 400 proceeds to 460.

At 460, method 400 revises one variables stored in memory. Method 400 updates variable extra_delay_cycle to equal a value of variable max_extra_delay. The value of variable max_extra_delay is set to a value of between 1 and 1.5 (cycles). This value limits the fuel injection delay estimate to a reasonable value. Method 400 proceeds to 448.

At 444, method 400 examines the cylinder firing array and determines the cylinder in the array to receive the fuel being currently computed. Then, method 400 counts cylinder firing array cells until a cell is reached where fuel is injected and the count is stored to memory. For example, using the firing array above, if the cylinder to receive fuel is cylinder three as indicated by the second cell in the array moving from left to right, then the count is a value of one when it is determined that the next cylinder to receive fuel is cylinder number four as indicated by the third cell in the array. However, if the value in cell three is zero, the count increased to a value of two and stops when it is found that cylinder number two receives fuel based on the value in the fourth cell. Method 400 proceeds to 446.

At 446, method 400 converts the count values from 402 and 404 into values having engine cycle units. In particular, the count from step 444 is converted into engine cycle units by dividing the variable count by the number of cylinders per engine cylinder bank, or extra_delay_cycle=(count−1)/cyl_per_bank, where count is the count of how many cylinder events (e.g., cells in the cylinder firing schedule array) are there ahead of the present cylinder event where fuel is not injected to cylinders of the cylinder bank. The variable cyl_per_bank is the number of cylinders within the cylinder bank being regulated by the controller. Method 400 proceeds to 448.

At 448, method 400 determines the additional or extra fuel injection delay time associated with deactivating one or more engine cylinders of a cylinder bank. In one example, the extra fuel injection delay time is determined by the following equation: extra_delay_tm=extra_delay_cycle*engine_cycle_tm, where extra_delay_tm is the fuel injectin delay time and engine_cycle_tm is the time it takes for the engine to complete two engine revolutions (or one cycle) at the present engine speed. The operations of step 448 are performed at predetermined constant time intervals. Method 400 proceeds to 450.

At 450, method 400 retrieves a fuel injection time delay from a table in memory. The table in memory may be indexed via present engine speed and present engine torque output. The table outputs an empirically determined fuel injection time delay for when the engine is operating with all cylinders activated and combusting air and fuel. The base fuel injection time delay occupies a variable in memory base_delay_tm. The operations of step 450 are performed at predetermined constant time intervals. Method 400 proceeds to 452.

At 452, method 400 determines the total fuel injection delay time for the present engine cycle. The total fuel injection delay time is given by the equation: total_delay_tm=extra_delay_tm+base_delay_tm. The operations of step 452 are performed at predetermined constant time intervals. Method proceeds to 454.

At 454, method 400 adjusts a fuel injection delay time (e.g., a value stored in block 308 of FIG. 3) with the value determined at 452. Further, fuel injection timing adjustments are applied to timing of fuel injectors of a cylinder bank so that the amount of fuel injected to engine cylinders is adjusted responsive to the fuel injection delay time as describe in FIG. 3. Method 400 proceeds to exit.

In this way, fuel injection delay may be adjusted based on a known cylinder firing schedule so that the fuel injection delay time may be more precisely determined. The fuel injection delay time may allow proportional and integral gain values of a fuel controller to be increased without causing the fuel control system to oscillate fuel delivery.

Thus, the method of FIG. 5 provides for an engine control method, comprising: injecting fuel to an engine via a controller in response to a fuel injection delay produced via a weighted average of a fuel injection delay of a past engine cycle and a fuel injection delay of a present engine cycle. The method includes where the fuel injection delay is estimated without a cylinder firing schedule of a cylinder cycle. The method includes where estimating the fuel injection delay also includes adding a base fuel injection delay to the weighted average.

In some examples, the method includes where the base fuel injection delay is a fuel injection delay time when all engine cylinders of an engine are combusting air and fuel. The method includes where the fuel injection delay of the present engine cycle is based on a value of a counter that is incremented in response to absence of injecting fuel to a cylinder of an engine bank during a prescribed crankshaft angular interval of the present engine cycle. The method also includes where the fuel injection delay of the past engine cycle is based on a value of a counter that is incremented in response to absence of injecting fuel to a cylinder of an engine bank during a prescribed crankshaft angular interval of a past engine cycle. The method further comprises compensating for the fuel injection delay via a fuel controller included in the controller.

The method of FIG. 6 provides for an engine control method, comprising: injecting fuel to an engine via a controller in response to a fuel injection delay produced via adding a base cylinder delay time and an extra delay time, the base cylinder delay time a first delay time for the engine when all cylinders of the engine are firing in a first cycle of the engine, the extra delay time a second delay time for the engine when less than all cylinders of the engine are firing in a second cycle of the engine. The method includes where the extra delay is produced via multiplying an actual total number of delay cycles by an engine cycle time. The method includes where the engine cycle time is a time it takes the engine to rotate two engine revolutions at a present speed of the engine. The method includes where the actual total number of delay cycles is based on a counter. The method also includes where the actual total number of delay cycles is based on a cylinder firing schedule array.

In some examples, the method further comprises compensating for the fuel injection delay via a fuel controller included in the controller. The method further comprises basing the extra delay time on a predetermined number of delay cycles when no cylinders are scheduled to fire during a next engine cycle.

Referring now to FIG. 7, an example sequence that shows how fuel injection delay time may be determined when a cylinder firing schedule array is not available. The sequence of FIG. 7 may be provided according to the method of FIG. 5. The plots shown in FIG. 7 occur at the same time and are aligned in time.

The first plot from the top of FIG. 7 is a plot of a cylinder interrupt signal state versus time. The cylinder interrupt signal is comprised of a series of pulses having a high level and a low level. The positive rising edges 702 of the signals may be part of a hardware interrupt that initiates control actions described in method 400. Each pulse of the trace corresponds to a cylinder number that is associated with the cylinder interrupt. For example, pulse 750 is a cylinder interrupt for cylinder number three. The rising edge 702 of the interrupt for cylinder number three may be at a prescribed engine position (e.g., 10 crankshaft degrees before top-dead-center compression stroke for cylinder number three). The rising edges of the cylinder interrupts correspond to similar engine positions for the other engine cylinders. The cylinder interrupt signal may be provided based on output of a crankshaft position sensor and output of a camshaft position sensor. The vertical axis represents cylinder interrupt state and the horizontal axis represents time. Time increases from the left side of the plot to the right side of the plot.

The second plot from the top of FIG. 7 is a plot of fuel injection events versus time. The vertical axis indicates fuel injection event state and fuel is being injected when the trace is at a higher level near the vertical axis arrow. Fuel is not being injected when the trace is at a lower level near the horizontal axis. In this example, fuel for a cylinder receiving fuel occurs before the cylinder interrupt for the cylinder receiving fuel. For example, the fuel injected at 752 is injected to cylinder number three. Thus, the fuel injection into a cylinder leads the cylinder interrupt rising edge for that cylinder in this example. Time increases from the left side of the plot to the right side of the plot.

The third plot from the top of FIG. 7 is a plot of a fuel injection delay counter value versus time. The vertical axis indicates the value of the fuel injection delay count (e.g., the value of variable extra_delay_count from FIG. 5) and the fuel injection delay count increases in the direction of the vertical axis arrow. Time increases from the left side of the plot to the right side of the plot.

The fourth plot from the top of FIG. 7 is a plot of a fuel injection delay time value versus time. The vertical axis indicates the value of the fuel injection delay time (e.g., the value of variable extra_delay_tm from FIG. 5) and the fuel injection delay count increases in the direction of the vertical axis arrow. Time increases from the left side of the plot to the right side of the plot.

At time T0, the cylinder interrupt state is at a low value and fuel is not being injected. The fuel injection delay count value is zero and the extra delay time is also zero. Fuel is injected to cylinder number one between time T0 and time T1.

At time T1, the rising edge of the cylinder interrupt signal occurs and an inquiry is made to determine if fuel was injected. Since fuel was injected between time T0 and time T1, the fuel injection delay count remains at zero since no fuel injection delay is induced via deactivating a cylinder. The extra delay time also remains at zero.

Between time T1 and time T2, fuel is injected two more times and two additional cylinder interrupts occur. The delay count value and extra delay time remain at values of zero. Fuel is not injected between the interrupt for cylinder number four and the interrupt for cylinder number two at time T2.

At time T2, the interrupt for cylinder number two occurs, but fuel was not injected to cylinder number two as indicated by the absence of a fuel injection pulse between the rising edge of cylinder number four interrupt and the rising edge of cylinder number two interrupt at time T2. Therefore, the value of the fuel injection delay count is increased by a value of one. Further, the value of the fuel injection delay time is increased based on the value of the fuel injection delay count as described in FIG. 5.

Between time T2 and time T3, fuel is injected to cylinder number one. The fuel injection delay counter value remains at a value of one and the extra delay time is a value greater than zero.

At time T3, the cylinder interrupt for cylinder number one occurs which causes the fuel injection counter to update. Since fuel was injected to cylinder number one, the fuel injection counter value is changed to zero and the extra delay time is changed to zero.

Between time T3 and time T4, fuel is not injected to cylinder number three. The fuel injection delay counter value remains at a value of zero and the extra delay time is a value of zero.

At time T4, the interrupt for cylinder number three occurs, but fuel was not injected to cylinder number three as indicated by the absence of a fuel injection pulse between the rising edge of cylinder number one interrupt and the rising edge of cylinder number three interrupt at time T4. Therefore, the value of the fuel injection delay count is increased by a value of one. Further, the value of the fuel injection delay time is increased based on the value of the fuel injection delay count as described in FIG. 5.

Between time T4 and time T5, fuel is not injected to cylinder number four. The fuel injection delay counter value remains at a value of one and the extra delay time is a value greater than zero.

At time T5, the interrupt for cylinder number four occurs, but fuel was not injected to cylinder number four as indicated by the absence of a fuel injection pulse between the rising edge of cylinder number three interrupt and the rising edge of cylinder number four interrupt at time T5. Therefore, the value of the fuel injection delay count is increased to a value of two. Further, the value of the fuel injection delay time is increased again based on the value of the fuel injection delay count as described in FIG. 5. The fuel injection delay and extra delay time are returned back to values of zero at the next cylinder interrupt for cylinder number 3 since fuel is injected to cylinder number two.

In this way, values of the fuel injection delay time and extra delay time may be adjusted based on observed fuel injection and cylinder interrupts. Knowledge of a cylinder firing schedule array is not used to determine the fuel injection delay time.

Referring now to FIG. 8, an example sequence that shows how fuel injection delay time may be determined when a cylinder firing schedule array is available. The sequence of FIG. 8 may be provided according to the method of FIG. 6. The plots shown in FIG. 8 occur at the same time and are aligned in time.

The first plot from the top of FIG. 8 is a plot of a cylinder interrupt signal state versus time. The cylinder interrupt signal is comprised of a series of pulses having a high level and a low level. The positive rising edges 802 of the signals may be part of a hardware interrupt that initiates control actions described in method 400. Each pulse of the trace corresponds to a cylinder number that is associated with the cylinder interrupt. For example, pulse 820 is a cylinder interrupt for cylinder number three. The rising edge 802 of the interrupt for cylinder number three may be at a pre-scribed engine position (e.g., 10 crankshaft degrees before top-dead-center compression stroke for cylinder number three. The rising edges of the cylinder interrupts correspond to similar engine positions for the other engine cylinders. The cylinder interrupt signal may be provided based on output of a crankshaft position sensor and output of a camshaft position sensor. The vertical axis represents cylinder interrupt state and the horizontal axis represents time. Time increases from the left side of the plot to the right side of the plot.

The second plot from the top of FIG. 8 is a plot of cylinder firing schedule array versus time. The vertical axis indicates cylinder firing schedule array. The cylinder firing arrays 804 are updated once each engine cycle (e.g., two engine revolutions). In this example, the cylinder firing array is updated before the cylinder interrupt for cylinder number one. The cylinder firing array describes which cylinders receive fuel during the engine cycle as previously described. Zeros in the array indicate no fuel injection for the cylinder associated with the array cell. The horizontal axis represents time and time increases from the left side of the plot to the right side of the plot.

The third plot from the top of FIG. 8 is a plot of an extra_delay_cycle value versus time. The vertical axis indicates the value of the extra_delay_cycle variable (e.g., the value of variable extra_delay_cycle from FIG. 6) and the extra_delay_cycle value increases in the direction of the vertical axis arrow. The horizontal axis represents time and time increases from the left side of the plot to the right side of the plot.

The fourth plot from the top of FIG. 8 is a plot of a fuel injection delay time value versus time. The vertical axis indicates the value of the fuel injection delay time (e.g., the value of variable extra_delay_tm from FIG. 6) and the fuel injection delay count increases in the direction of the vertical axis arrow. The horizontal axis represents time and time increases from the left side of the plot to the right side of the plot.

At time T10, the cylinder interrupt state is low and the cylinder firing schedule is populated with values to indicate that all engine cylinders will fire during the present engine cycle. The extra_delay_cycle value is zero and the extra delay time is zero.

At time T11, the cylinder interrupt for cylinder number one occurs. Fuel was injected to cylinder number one as indicated by cell 850 of the cylinder firing schedule array and the counter that counts cylinders not receiving fuel increases to a value of one (not shown) when it evaluates cell 852. But, since cell 852 indicates fuel is injected to the next cylinder in the firing order for the cylinder bank, the count stops at one. Counting begins at the cylinder firing schedule array cell that corresponds to the present cylinder interrupt and ends at the cell where fuel injection is indicated. In this example, the counting starts from cell 850 and ends at cell 852. The extra delay cycle variable is a value of zero since the extra delay cycle calculation subtracts a value of one from the cycle counter. The extra delay time also remains at a value of zero since the extra delay cycle value is zero.

Between time T11 and time T12, several cylinder interrupts occur. However, since fuel is injected to cylinders, the extra delay cycle and extra delay time remain at zero. Shortly before time T12, the cylinder firing schedule array is updated and fuel is not injected to cylinder number three for this engine cycle as indicated by the value of zero in cell 862, At time T12, the cylinder interrupt for cylinder number one occurs. Fuel was injected to cylinder number one as indicated by cell 860 of the cylinder firing schedule array and the counter that counts cylinders not receiving fuel increases to a value of one (not shown) when it evaluates cell 862. But, since cell 862 indicates fuel is not injected to the next cylinder in the firing order for the cylinder bank, the count is a value of one and the counting continues to cell 864 where it is increased to a value of two and stopped because fuel injection is indicated again in the third cell. The extra delay cycle variable is increased to a value of one since the extra delay cycle calculation subtracts a value of one from the cycle counter which is a value of two at this point. The extra delay time increases in response to the extra delay cycle value increasing.

At time T13, the cylinder interrupt for cylinder number three occurs. Fuel was not injected to cylinder three as indicated by cell 862 of the cylinder firing schedule array, but the counter that counts cylinders not receiving fuel finds that fuel is delivered to cylinder number four at cell 864. Counting from cell 862, the counter increases to a value of one at cell 864 and then it stops because fuel is indicated as being injected. Therefore, the extra delay cycle value is zero and the extra delay time is zero.

Between time T13 and time T14, fuel is injected to each cylinder of the cylinder bank (the four cylinder engine has only one bank of cylinders), so the extra delay count and extra delay time remain at zero.

At time T14, the cylinder interrupt for cylinder number three occurs. Fuel was injected to cylinder number three as indicated by cell 870 of the cylinder firing schedule array and the counter that counts cylinders not receiving fuel increases to a value of one (not shown) when it evaluates cell 872. But, since cell 872 indicates fuel is not injected to the next cylinder in the firing order for the cylinder bank, the count is a value of one and the counting continues to cell 874 where it is increased to a value of two and stopped because fuel injection is indicated again in the fourth cell. The extra delay cycle variable is increased to a value of one since the extra delay cycle calculation subtracts a value of one from the cycle counter which is a value of two at this point. The extra delay time increases in response to the extra delay cycle value increasing.

At time T15, the cylinder interrupt for cylinder number four occurs. Fuel was not injected to cylinder four as indicated by cell 872 of the cylinder firing schedule array, but the counter that counts cylinders not receiving fuel finds that fuel is delivered to cylinder number two at cell 874. Counting from cell 872, the counter increases to a value of one at cell 874 and then it stops because fuel is indicated as being injected. Therefore, the extra delay cycle value is zero and the extra delay time is zero.

In this way, fuel injection delay time may be revised responsive to values in a cylinder firing schedule array so that the fuel injection delay may be based on known instances of cylinder deactivation which modifies the fuel injection delay time. As such, fuel injection timing delays may be based on an actual engine combustion sequence.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine control method, comprising:
   injecting fuel to an engine via a controller in response to a fuel injection delay produced via adding a base cylinder fuel injection delay time and an extra fuel injection delay time, the base cylinder fuel injection delay time a first delay time for the engine when all cylinders of the engine are firing in a first cycle of the engine, the extra fuel injection delay time a second delay time for the engine when less than all cylinders of the engine are firing in a second cycle of the engine, the fuel injection delay beginning at a time when a fuel is injected to a cylinder and ending when byproducts of the fuel are sensed via an oxygen sensor.

2. The method of claim 1, where the extra fuel injection delay time is produced via multiplying an actual total number of delay cycles by an engine cycle time, and where the extra fuel injection delay time is based on a value of a counter that is incremented in response to absence of injecting fuel to a cylinder of an engine bank during a prescribed crankshaft angular interval of a past engine cycle.

3. The method of claim 2, where the engine cycle time is a time it takes the engine to rotate two engine revolutions at a present speed of the engine.

4. The method of claim 2, where the actual total number of delay cycles is based on the counter, and further comprising incrementing a value of the counter responsive to an absence of injecting fuel to a cylinder of the engine bank during the prescribed crankshaft angular interval of a present engine cycle.

5. The method of claim 2, where the actual total number of delay cycles is based on a cylinder firing schedule array.

6. The method of claim 1, further comprising compensating for the fuel injection delay via a fuel controller included in the controller.

7. The method of claim 1, further comprising basing the extra fuel injection delay time on a predetermined number of delay cycles when no cylinders are scheduled to fire during a next engine cycle.

\* \* \* \* \*